United States Patent
Ruehle et al.

(10) Patent No.: US 6,681,999 B1
(45) Date of Patent: Jan. 27, 2004

(54) FUEL INJECTION VALVE

(75) Inventors: Wolfgang Ruehle, Ditzingen (DE); Hubert Stier, Asperg (DE); Matthias Boee, Ludwigsburg (DE); Guenther Hohl, Stuttgart (DE); Norbert Keim, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 341 days.

(21) Appl. No.: 09/889,290

(22) PCT Filed: Nov. 11, 2000

(86) PCT No.: PCT/DE00/04018

§ 371 (c)(1),
(2), (4) Date: Nov. 20, 2001

(87) PCT Pub. No.: WO01/36807

PCT Pub. Date: May 25, 2001

(30) Foreign Application Priority Data

Nov. 13, 1999 (DE) .......................... 199 54 802

(51) Int. Cl.$^7$ ................. A62C 37/00; F02M 59/00; F02M 39/00; B05B 1/30
(52) U.S. Cl. ................. 239/75; 239/533.2; 239/585.1; 239/585.5; 239/533.3
(58) Field of Search ........................... 239/75, 88, 89, 239/91, 139, 533.2, 533.3, 585.1, 585.3, 585.4, 585.5, 900; 251/129.15, 129.21, 127

(56) References Cited

U.S. PATENT DOCUMENTS

| | | | | |
|---|---|---|---|---|
| 5,579,739 A | * | 12/1996 | Tuckey et al. | 123/467 |
| 5,779,149 A | * | 7/1998 | Hayes, Jr. | 239/124 |
| 5,875,764 A | | 3/1999 | Kappel et al. | |
| 6,062,533 A | * | 5/2000 | Kappel et al. | 251/57 |
| 6,213,414 B1 | * | 4/2001 | Stier et al. | 239/584 |
| 6,478,013 B1 | * | 11/2002 | Boecking | 123/467 |

FOREIGN PATENT DOCUMENTS

| | | |
|---|---|---|
| DE | 37 42 241 | 8/1988 |
| DE | 195 19 192 | 6/1996 |
| DE | 197 42 320 | 4/1999 |
| DE | 197 43 299 | 4/1999 |
| DE | 198 07 903 | 9/1999 |

* cited by examiner

Primary Examiner—Davis Hwu
(74) Attorney, Agent, or Firm—Kenyon & Kenyon

(57) ABSTRACT

A fuel injector, in particular a fuel injector for fuel systems of internal combustion engines, has a piezoelectric or magnetostrictive actuator, a valve needle operated by the actuator by way of a hydraulic temperature compensation device, and a valve closing body operated by the valve needle and cooperating with a valve seat face to form a scaling seat. The temperature compensation device includes a needle driving sleeve which surrounds a valve needle shoulder of the valve needle and, together with a needle driving shoulder, surrounds the valve needle in sections. In addition, the needle driving sleeve together with the valve needle encloses a temperature compensation space, and the temperature compensation space is connected to a fuel inlet of the fuel injector through a directional valve for filling the temperature compensation space with fuel.

13 Claims, 1 Drawing Sheet

FUEL INJECTION VALVE

FIELD OF THE INVENTION

The present invention relates to a fuel injector.

BACKGROUND INFORMATION

German Patent No. 195 19 192 describes a fuel injector that has a piezoelectric actuator, a valve needle operated by the actuator by a hydraulic step-up mechanism of the lift and a valve closing body operated by the valve needle and cooperating with a valve seat face to form a sealing seat. The stroke step-up mechanism here also assumes the function of temperature compensation, for which purpose annular gaps are provided in the stroke step-up mechanism, permitting fuel to flow into and out of a stroke step-up space for compensation of a temperature-induced change in length of components of the fuel injector.

The fuel injector known from German Patent No. 195 19 192 has the disadvantage that fuel flows into and out of the stroke step-up space through the annular gap only at a low fuel flow, so the time required to completely fill the stroke step-up space is much longer than one injection cycle. The known fuel injector is therefore not suitable for volatile fuels such as gasoline. When the fuel used is gasoline, some gasoline evaporates out of the stroke step-up space when the fuel injector does not operate for a long time, in particular at high ambient temperatures, so that when the actuator is operated, there cannot be a dynamic transfer of force to the valve needle and thus the fuel injector cannot be operated quickly enough.

German Patent No. 37 42 241 describes a fuel injector having a hydraulic stroke step-up device, in which hydraulic oil is used as the hydraulic medium. Temperature compensation here takes place through a non-return valve arranged in a valve needle and through annular gaps provided between the valve needle and a cylinder or between the cylinder and a sleeve. In operation of a fuel injector, the cylinder displaces a portion of the hydraulic oil out of the stroke step-up space, thus operating the valve needle against the direction of displacement of the cylinder.

SUMMARY OF THE INVENTION

The fuel injector according to the present invention has the advantage over the related art that a temperature compensation space is formed by a simple design measure, utilizing the fuel pressure to fill the temperature compensation space completely with fuel through a directional valve within a short period of time.

It is advantageous that the directional valve is connected to the interior of the needle driving sleeve, and it is especially advantageous that the needle driving sleeve has a lateral recess which is part of a fuel line connecting the fuel inlet to the temperature compensation space over the directional valve. This permits a compact design of the temperature compensation device.

In an advantageous manner, a closing spring provided in an interior space of the needle driving sleeve; this closing spring acts on the fuel pressure in the temperature compensation space by way of the valve needle shoulder. Space provided in the interior of the needle driving sleeve can be utilized to accommodate the closing spring, thus yielding a more compact design of the fuel injector.

It is advantageous that the valve needle has a recess and that a ball arranged in the recess to form the directional valve cooperates with a concentric sealing face, in particular a conical sealing face of the recess, to form a sealing seat. Integrating the directional valve into the valve needle makes it possible to save on parts, and manufacturing complexity can be reduced due to the simple design.

An adjusting pin is advantageously provided in the recess to adjust a maximum opening motion of the ball and is connected to the valve needle. In particular, the response characteristic of the directional valve can be predetermined by adjusting the maximum opening motion.

It is advantageous that an annular gap provided between the valve needle shoulder and the needle driving sleeve permits fuel to escape from the temperature compensation space in a temperature-induced change in length of parts of the fuel injector. The guide face provided between the valve needle shoulder and the needle driving sleeve is designed in this way so that it also permits venting of the temperature compensation space. It is also advantageous that an annular gap is provided between the valve needle and the shoulder of the needle driving sleeve.

DETAILED DESCRIPTION

Figure 1:
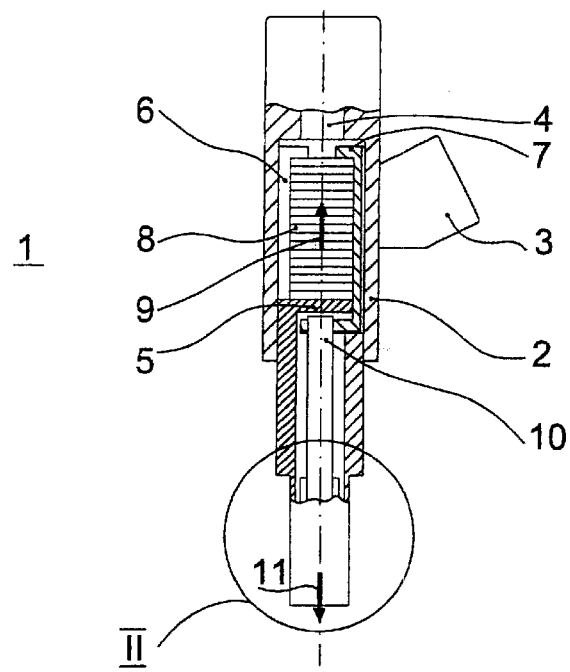
FIG. 1 shows a detail of an axial section through an embodiment of a fuel injector according to the present invention.

FIG. 1 shows a fuel injector 1 according to the present invention in a partial axially sectioned diagram. Fuel injector 1 is used in particular for direct injection of fuel, gasoline in particular, into a combustion chamber of an internal combustion engine having fuel mixture compression and spark ignition, namely a direct gasoline injector. In this embodiment, fuel injector 1 is designed as an inward opening fuel injector 1. However, fuel injector 1 according to the present invention is also suitable for other applications.

Fuel injector 1 has a valve housing 2 including an electric terminal 3 and a fuel inlet 4. A piezoelectric or magnetostrictive actuator 8 located inside valve housing 2 of fuel injector 1 is supported on a supporting element 5 connected to valve housing 2 and surrounded by bracket segments 6, 7. Upon operation of actuator 8, the actuator expands in operating direction 9, so that bracket segments 6, 7 and a lifter 10 connected to bracket segments 6, 7 move in operating direction 9. This results in a reversal of stroke, so that lifter 10 moves against spray direction 11 when actuator 8 is operated.

Figure 2:
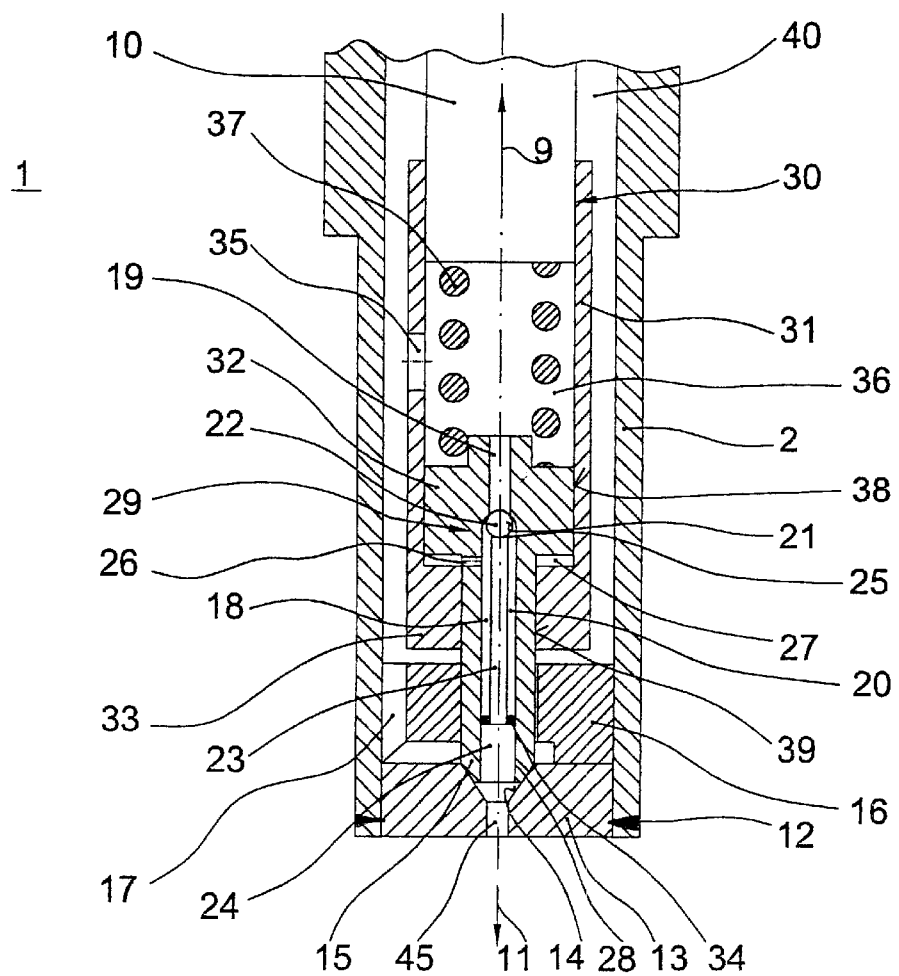
FIG. 2 shows the detail labeled as II in FIG. 1 in an axial sectional diagram.

FIG. 2 shows the detail of the embodiment of fuel injector 1 labeled as II in FIG. 1 in a detail of an axial sectional diagram.

Valve housing 2 is connected to a valve seat body 13 by a peripheral weld 12. Valve seat body 13 has a valve seat face 14 which cooperates with a valve closing body 28 designed on a valve needle 15 to form a sealing seat. Valve needle 15 is guided by a valve needle guide 16 having at least one recess 17 for supplying fuel to the sealing seat formed by valve needle 15 and valve seat face 14.

Valve needle 15 has an internal longitudinal recess 18 including a first section 19 and a second section 20, a conical sealing face 21 being formed between first section 19 and a second section 20. A ball 22 rests on sealing face 21 of recess 18 in second section 20 of recess 18. The diameter of first section 19 is smaller than the diameter of ball 22, so that ball 22 cannot enter section 19, and the diameter of ball 22 is smaller than the diameter of second section 20, so the ball is movable in second section 20. The movement of ball 22 is limited by an adjusting pin 23 which is secured in recess 18 of valve needle 15 by an adjusting element 24. Adjusting element 24 is fitted into recess 18 in valve needle 15 and is sealed off from second section 20 of recess 18 by a sealing ring 34 for sealing second section 20 of recess 18. Due to the distance between sealing face 21 and a top end face 25 of adjusting pin 23, the movement of ball 22 is limited, so that a maximum opening movement of ball 22 can be adjusted by adjusting pin 23. Valve needle 15 has a lateral bore 26 connecting second section 20 of recess 18 to a temperature compensation space 27. In this way, a directional valve 29 formed by ball 22 and sealing face 21 opens when fuel flows from first section 19 of recess 18 into second section 20 of recess 18 and closes when the flow of fuel is reversed.

Lifter 10 is connected by a peripheral weld 30 to a needle driving sleeve 31 which surrounds a valve needle shoulder 32 of valve needle 15 and surrounds sections of valve needle 15 with a needle driving shoulder 33. Needle driving sleeve 31 together with valve needle 15 encloses temperature compensation space 27, so the volume of temperature compensation space 27 can be varied by the distance between valve needle shoulder 32 and needle driving shoulder 33.

Needle driving sleeve 31 has a lateral recess 35 formed as a bore in this embodiment. A fuel line is formed by lateral recess 35, an interior space 36 of needle driving sleeve 31, recess 18 and bore 26, connecting fuel inlet 4 to temperature compensation space 27 through the directional valve.

A closing spring 37 is provided in interior 36 of needle driving sleeve 31, acting on the fuel pressure in temperature compensation space 27 by way of valve needle shoulder 32 of valve needle 15. Closing spring 37 is supported on lifter 10 on one end and on valve needle shoulder 32 of valve needle 15 on the other end.

An annular gap 38 is formed between valve needle shoulder 32 of valve needle 15 and needle driving sleeve 31, creating a highly throttled fuel flow between interior 36 of needle driving sleeve 31 and temperature compensation space 27. In addition, an annular gap 39 is provided between valve needle 15 and needle driving shoulder 33 of needle driving sleeve 31, permitting a highly throttled fuel flow between temperature compensation space 27 and an interior space 40 of fuel injector 1.

The functioning of the temperature compensation device according to the present invention is described in greater detail below. It is first assumed here that fuel injector 1 is at least not completely filled with fuel.

In operation of fuel injector 1, fuel is conveyed through fuel inlet 4 under a high pressure into interior space 40 of fuel injector 1, causing fuel to fill up interior space 40 of fuel injector 1, recess 17 of valve needle guide 16 and, through lateral recess 35 in needle driving sleeve 31, interior space 36 of needle driving sleeve 31. Fuel flows out of interior space 36 of needle 30 driving sleeve 31 into first section 19 of recess 18, thus producing an excess pressure with respect to second section 20 of recess 18, so that ball 22 of directional valve is lifted up from sealing face 21, and fuel fills up second section 20, bore 26 and, through bore 26, temperature compensation space 27.

When actuator 8 is operated, lifter 10 moves in operating direction 9, so that needle driving shoulder 33 acts on valve needle shoulder 32 of valve needle 15 through the fuel in the completely filled temperature compensation space 27, lifting it up from valve seat face 14 of valve seat body 13 and causing the sealing seat to open. Through the resulting gap between valve needle 15 and valve seat face 14, fuel flows out of interior space 40 of fuel injector 1 through recess 17 in valve needle guide 16 and into a spray channel 45, so fuel is sprayed out of fuel injector 1. An excess pressure is created in the movement of needle driving shoulder 33 in operating direction 9 in temperature compensation space 27, pressing ball 22 against sealing seat 21 and closing directional valve 29.

In resetting lifter 10, needle driving shoulder 33 of needle driving sleeve 31 is moved against operating direction 9, closing spring 37 entraining valve needle 15 in needle driving sleeve 31, so that the volume of temperature compensation space 27 remains at least approximately constant.

If, because of a change in length of parts of fuel injector 1, valve needle 15 comes to rest against valve seat face 14 of valve seat body 13 before needle driving shoulder 33 of needle driving sleeve 31 is completely reset, then the volume of temperature compensation space 27 is increased on complete resetting of needle driving shoulder 33, so that fuel pressure in temperature compensation space 27 is reduced in comparison with the fuel pressure of fuel supplied by fuel inlet 4, so that directional valve 29 opens and more fuel flows into temperature compensation space 27.

If, in the case of a temperature-induced change in length of parts of fuel injector 1, resetting of needle driving shoulder 33 of needle driving sleeve 31 is achieved before complete closing of the sealing seat formed by valve needle 15 and valve seat face 14 of valve seat body 13, then fuel is displaced out of temperature compensation space 27 through annular gaps 38, 39 because of the fuel pressure of fuel in interior space 36 of needle driving sleeve 31 and the force of closing spring 37, so that complete closing of valve needle 15 is achieved.

If, after a pause in operation of fuel injector 1, temperature compensation space 27 is filled with fuel only partially or not at all, then it is filled completely with fuel through directional valve 29, thereby adjusting the volume of temperature compensation space 27 to the closed position of fuel injector 1.

Since changes in temperature take place slowly in comparison with the opening time of the valve, temperature-induced changes in length are compensated, in particular when fuel injector 1 is closed, i.e., when valve closing body 28 is in contact with valve seat face 14.

In operation of fuel injector 1, closing spring 37 causes a slight reduction in size of temperature compensation space 27 in the open position of fuel injector 1, i.e., when valve needle 15 is lifted up from valve seat face 14, because leakage flow of fuel out of temperature compensation space 27 is created by the action of valve needle 15 on valve needle shoulder 32. In general, the case discussed above occurs valve needle 15 comes in contact with valve seat face 14 of valve seat body 13 before needle driving shoulder 33 of needle driving sleeve 31 has been completely reset. Fuel injector 1 therefore always closes with an excess force which depends on closing spring 37.

The present invention is not limited to the embodiment described here. In particular, the present invention is also suitable for an outward opening fuel injector 1.

What is claimed is:

1. A fuel injector, comprising:
   one of a piezoelectric actuator and a magnetostrictive actuator;
   a hydraulic temperature compensation device;
   a valve needle operable by the one of the piezoelectric actuator and magnetostrictive actuator via the hydraulic temperature compensation device;

a valve seat face;

a directional valve; and a valve closing body operable by the valve needle and cooperating with the valve seat face to form a sealing seat, wherein:

the hydraulic temperature compensation device includes a needle driving sleeve that surrounds a valve needle shoulder of the valve needle and, together with a needle driving shoulder, surrounds the valve needle in sections, the needle driving sleeve together with the valve needle encloses a temperature compensation space, and the temperature compensation space is connected to a fuel inlet of the fuel injector via the directional valve, the directional valve filling the temperature compensation space with a fuel.

2. The fuel injector according to claim 1, wherein:

the fuel injector is for a fuel injection system of an internal combustion engine.

3. The fuel injector according to claim 1, wherein:

the directional valve is connected to an interior space of the needle driving sleeve.

4. The fuel injector according to claim 3, wherein:

the needle driving sleeve includes a lateral recess that is part of a fuel line connecting the fuel inlet to the temperature compensation space through the directional valve.

5. The fuel injector according to claim 1, further comprising:

a closing spring arranged in an interior space of the needle driving sleeve and acting on a fuel pressure in the temperature compensation space by way of the valve needle shoulder of the valve needle.

6. The fuel injector according to claim 1, further comprising:

a ball, wherein:

the valve needle includes a recess, to form the directional valve in the recess, the ball cooperates with a concentric sealing face of the recess to form the sealing seat.

7. The fuel injector according to claim 6, wherein:

the concentric sealing face corresponds to a conical sealing face.

8. The fuel injector according to claim 6, further comprising:

an adjusting pin connected to the valve needle and arranged in the recess for adjusting a maximum opening movement of the ball of the directional valve.

9. The fuel injector according to claim 6, wherein:

the recess in the valve needle is connected to the temperature compensation space through a lateral bore in the valve needle.

10. The fuel injector according to claim 1, wherein:

a gap is provided between the valve needle shoulder and the needle driving sleeve in order to permit the fuel to escape out of the temperature compensation space when a temperature-induced change in length of parts of the fuel injector occurs.

11. The fuel injector according to claim 10, wherein:

the gap is an annular gap.

12. The fuel injector according to claim 1, wherein:

wherein a gap is provided between the valve needle and the needle driving shoulder of the needle driving sleeve in order to permit the fuel to escape out of the temperature compensation space when a temperature-induced change in length of parts of the fuel injector occurs.

13. The fuel injector according to claim 12, wherein:

the gap is an annular gap.

* * * * *

UNITED STATES PATENT AND TRADEMARK OFFICE
CERTIFICATE OF CORRECTION

PATENT NO. : 6,681,999 B1
DATED : January 27, 2004
INVENTOR(S) : Wolfgang Ruehle et al.

It is certified that error appears in the above-identified patent and that said Letters Patent is hereby corrected as shown below:

<u>Title page,</u>
Item [57], ABSTRACT, change "scaling" to -- sealing --.

Signed and Sealed this

Fourth Day of January, 2005

JON W. DUDAS
*Director of the United States Patent and Trademark Office*